(12) United States Patent
Springer et al.

(10) Patent No.: US 9,195,116 B2
(45) Date of Patent: Nov. 24, 2015

(54) FOCUS CONTROL FOR PTZ CAMERAS

(71) Applicant: PELCO, INC., Clovis, CA (US)

(72) Inventors: Derek G. Springer, Fresno, CA (US);
Chien-Min Huang, Clovis, CA (US);
David George Wright, Clovis, CA (US);
Brian Chi Yeong Jeong, Clovis, CA (US); John E. Haag, Clovis, CA (US);
Jeremy A. Watson, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 0 days.

(21) Appl. No.: 14/349,257

(22) PCT Filed: Oct. 10, 2012

(86) PCT No.: PCT/US2012/059458
§ 371 (c)(1),
(2) Date: Apr. 2, 2014

(87) PCT Pub. No.: WO2013/055737
PCT Pub. Date: Apr. 18, 2013

(65) Prior Publication Data
US 2014/0253783 A1    Sep. 11, 2014

Related U.S. Application Data (60) Provisional application No. 61/547,599, filed on Oct. 14, 2011.

(51) Int. Cl.
*H04N 5/225* (2006.01)
*G02B 13/16* (2006.01)
(Continued)

(52) U.S. Cl.
CPC  *G03B 13/36* (2013.01); *G02B 7/28* (2013.01); *G02B 7/287* (2013.01); *H04N 5/23212* (2013.01); *H04N 5/23216* (2013.01); *H04N 5/23296* (2013.01)

(58) Field of Classification Search
CPC .......... H04N 5/23216; H04N 5/23296; H04N 5/23212; G03B 13/36; G03B 7/28; G03B 7/287
USPC .................. 348/335, 340, 345, 348, 350, 352
See application file for complete search history.

(56) References Cited

U.S. PATENT DOCUMENTS

| 4,794,417 A | 12/1988 | Sekiguchi et al. |
| 5,617,140 A | 4/1997 | Jeong |

(Continued)

FOREIGN PATENT DOCUMENTS

| JP | 2010136250 A | 6/2010 |
| KR | 100841290 B1 | 6/2008 |
| KR | 20100058303 A | 6/2010 |

OTHER PUBLICATIONS

International Search Report & Written Opinion of the International Searching Authority (KR) dated Mar. 26, 2013 for International Application No. PCT/US2012/059458, 9 pages.

(Continued)

*Primary Examiner* — Yogesh Aggarwal
(74) *Attorney, Agent, or Firm* — Hunter Clark PLLC (57) ABSTRACT

Systems and methods for focus control in a pan-tilt-zoom (PTZ) camera system are described herein. An example of a method described herein includes identifying a set of trace curves associated with the camera system, each of the trace curves specifying relationships between focus lens positions and zoom lens positions for a corresponding camera position, selecting a trace curve using the set of trace curves and one or more of pan angle, tilt angle or installation height of the camera system, and identifying a focus lens position for a current zooming factor of the camera system based on the selected trace curve.

10 Claims, 5 Drawing Sheets

(51) Int. Cl.
*G03B 13/36* (2006.01)
*H04N 5/232* (2006.01)
*G02B 7/28* (2006.01)

(56) References Cited

U.S. PATENT DOCUMENTS 5,742,435 A 4/1998 Nagashima et al.
6,714,665 B1 * 3/2004 Hanna et al. ............... 382/117
7,391,462 B2 * 6/2008 Ike ............................... 348/347
2008/0025711 A1 1/2008 Chi
2010/0290772 A1 11/2010 Ito

OTHER PUBLICATIONS

International Preliminary Report on Patentability for International Application No. PCT/US2012/059458, mailed Apr. 24, 2014, 6 pages.
Supplementary European Search Report & European Search Opinion dated May 4, 2015 for European Application No. EP12840009, 7 pgs.

* cited by examiner

FOCUS CONTROL FOR PTZ CAMERAS

BACKGROUND

Cameras, such as fixed cameras and pan/tilt/zoom (PTZ) cameras, utilize optical systems for focusing a captured image on objects of interest. In a camera optical system, there are different lenses for zoom (referred to herein as a "zoom lens") and focus (referred to herein as a "focus lens"). The zooming factor is determined by the zoom lens, whereas whether the image is focused is determined via the focus lens. The camera system may utilize a varifocal lens, which is a camera lens with variable focal length in which focus changes as focal length (and magnification) changes, as compared to a parfocal zoom lens, which remains in focus as the lens zooms (i.e., the focal length and magnification change).

Under good lighting conditions, the aperture will be small, and thus the depth of the field will be relatively wide. As a result, the camera may produce a focused image under a wide range of focus lens positions. However, under less optimal lighting conditions, the aperture becomes wider, and thus the depth of field becomes narrower. In this case, focus lens position may have a larger impact on image focus. If the zoom lens is in the high zooming factor region and the depth of field also narrows, correct focus lens position has a significant impact on producing a good focused image. When both bad lighting conditions and a high zooming factor are present, the depth of field becomes narrower and the focus lens position again has a significant impact on image focus. As focus issues are most prevalent in low light conditions, a high zooming factor is used.

SUMMARY

Systems and methods for controlling focus of a PTZ camera system are described. A method of adjusting focus for a camera system as described herein includes identifying a set of trace curves associated with the camera system, each of the trace curves specifying relationships between focus lens positions and zoom lens positions for a corresponding camera position; selecting a trace curve using the set of trace curves and one or more of pan angle, tilt angle or installation height of the camera system; and identifying a focus lens position for a current zooming factor of the camera system based on the selected trace curve.

Implementations of the method may include one or more of the following features. Selecting the trace curve by computing a target focal distance based on an installation height of the camera system and the tilt angle of the camera system and translating the target focal distance to a trace curve of the set of trace curves. The installation height is provided as user input. The installation height is computed using a calibration procedure. Building a lookup table (LUT) of trace curves comprising entries for respective combinations of pan angles and tilt angles. Interpolating the trace curve from at least one entry of the LUT based on at least one of the pan angle of the camera system or the tilt angle of the camera system. Interpolating a focus lens position corresponding to a telephoto zoom lens position at the pan angle of the camera system and the tilt angle of the camera system; obtaining one or more best-fit trace curves for the interpolated focus lens position from the LUT; and interpolating the trace curve using the best-fit trace curves. Building the LUT to account for a structure placed over the camera system. Identifying a set of distances corresponding to trace curves in the LUT; and, for each of the set of distances, finding a corresponding trace curve by identifying optimal focus lens positions corresponding to a plurality of zoom lens positions using an auto-focus algorithm.

An example of an apparatus as described herein includes means for identifying a set of trace curves associated with a camera system, each of the trace curves specifying relationships between focus lens positions and zoom lens positions for a corresponding camera position; means for selecting a trace curve using the set of trace curves and one or more of pan angle, tilt angle or installation height of the camera system; and means for identifying a focus lens position for a current zooming factor of the camera system based on the selected trace curve.

An example of a system for adjusting focus for a camera system as described herein includes at least one processor and at least one memory communicatively coupled to the at least one processor and configured to store data. The processor is configured to perform acts including identifying a set of trace curves associated with the camera system, each of the trace curves specifying relationships between focus lens positions and zoom lens positions for a corresponding camera position; selecting a trace curve using the set of trace curves and one or more of pan angle, tilt angle or installation height of the camera system; and identifying a focus lens position for a current zooming factor of the camera system based on the selected trace curve.

An example of a computer program product as described herein resides on a processor readable storage medium and includes processor executable instructions configured to cause a processor to identify a set of trace curves associated with the camera system, each of the trace curves specifying relationships between focus lens positions and zoom lens positions for a corresponding camera position; select a trace curve using the set of trace curves and one or more of pan angle, tilt angle or installation height of the camera system; and identify a focus lens position for a current zooming factor of the camera system based on the selected trace curve.

Items and/or techniques described herein may provide one or more of the following capabilities, as well as other capabilities not mentioned. Focus of a PTZ camera system can be maintained through movement of the camera without requiring excessive auto-focus cycles or other inconvenience. Resiliency of camera focus to low light conditions, bright elements within a scene, moving objects, and other conditions is improved. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

As described above, a camera optical system utilizes different lenses for zoom and focus, e.g., a zoom lens and a focus lens. For instance, a camera optical system can utilize a verifocal lens, which is a camera lens with variable focal length in which focus changes as focal length (and magnification) change, as compared to a parfocal (or "true") zoom lens, which remains in focus as the lens zooms (e.g., changing the focal length and magnification). At a fixed distance between the camera and target, the curve of the best focus lens position for each different zooming factor (or zoom lens position) is called a trace-curve. A trace-curve for a given distance includes recorded focus positions that correspond to a focal distance for steps along the zoom range of a varifocal lens package. By utilizing entries of various trace-curves and a ratio/relationship to those curves, the focus position of the camera can be approximated for a specific distance throughout the zoom range of the camera.

Figure 1:
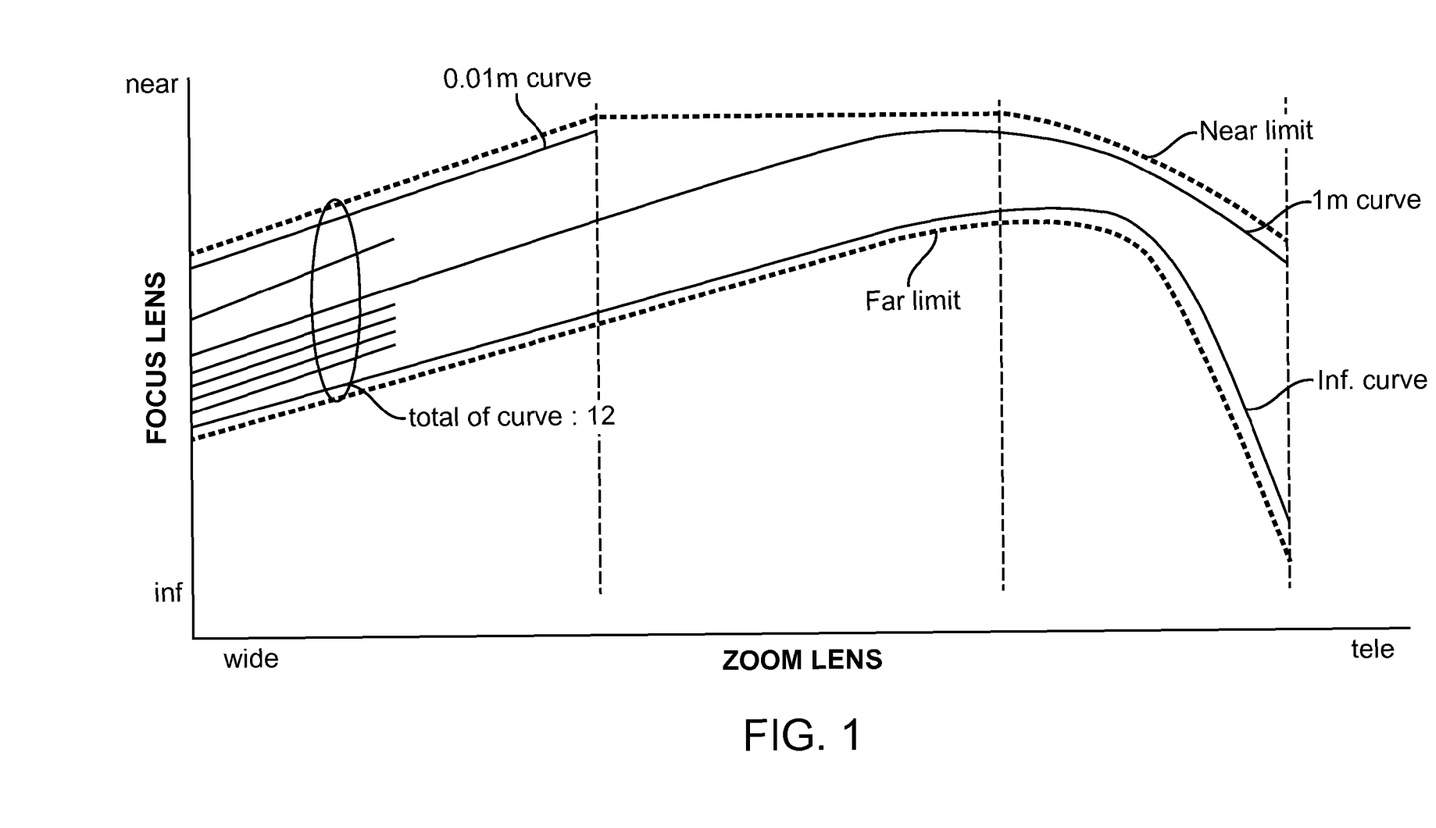
FIG. 1 is a diagram showing trace curves for an example camera system.

When the distance between camera and target is changed, the trace-curve will also change and therefore be different. FIG. 1 illustrates the trace-curves of an example integrated optics package (IOP) unit that is used in a PTZ camera. At the wide end of the zoom lens position, the focus lens positions are close together. In contrast, at the telephoto end, the focus lens positions are spread wider. There is no intersection between any two trace-curves. Thus, for every unique distance between camera and target, there exists a unique trace-curve.

In general, there are several ways to produce a focused image, such as using an auto-focusing algorithm, a trace-curves look-up-table (LUT), or a combination of the two. The auto-focusing algorithm first computes the sharpness of the images in a range of focus lens positions and then selects the position that has the highest sharpness value. In order to find an optimal focus lens position, the camera sweeps from one end of the available focus lens positions to the other and at the same time compute the sharpness. Therefore, as focus lens positions are analyzed, the captured video will appear to clear and then blur. This can be a significant inconvenience to a user, for instance when the zooming factor or the distance between camera and target are constantly changing.

If the distance between the camera and target is known, the LUT method may be used. To find this distance with sufficient accuracy, a variety of distance measuring devices are available (e.g., a laser distance measurer, etc.). While these devices can be integrated into a camera system, they may have problems with longer distances due to power issues, and this may increase the cost of the camera system significantly.

Alternatively, a combination of the above two solutions can be used. At the start, the auto-focusing algorithm is used to find the best focus lens position, and once the best focus lens position is found (assuming no change in distance), the trace-curve LUT method is used when the zoom factor changes. However, when the distance is changed, auto-focusing must be repeated. This can become an inconvenience when the distance is constantly changing, e.g., when the target is moving. Further, the focus lens position found by the auto-focusing algorithm may not be of sufficient accuracy in some cases. For instance, if a focus lens position is found when the zoom lens is located at the wide end, the image will become go out of focus when the camera zooms in.

In a PTZ camera that uses a varifocal lens package, good focus performance can be hard to achieve in various scene conditions. For instance, low light conditions, bright point scenes, zooming from wide angle to telephoto, bland scenes, and others can cause auto-focus and focus trace mechanisms to fail. More particularly, low light conditions provide much less image information to auto-focus algorithms to operate well. As a result, auto-focus algorithms may not find focus lock or lock into a non-optimum focus in such conditions.

Bright point scenes are difficult for auto-focus algorithms because they can often choose to lock on to a de-focused light source instead of the objects in the scene. This occurs because that de-focused light source blooms and produces a large sharp bright object but the rest of the scene will be out-of-focus. A "bright point scene" is defined as a scene where bright light point sources within the scene are much brighter than the ambient light in the scene. This often occurs, e.g., at night where car headlights enter a scene that is mostly filled with darkness or when a camera system is panned into a scene where street lamps illuminate a mostly dark street. Another instance is a scene containing a traffic light, due to its always changing bright points as the light changes from green to red and back.

With varifocal lens packages, upon a zoom operation the camera selects a ratio between two different trace curves to follow while zooming. Additionally, there are more steps between curves at telephoto zoom positions than at wide angle zoom positions. Thus, when the camera chooses a trace curve and ratio/relationship to follow, it may select the wrong relationship for the target focus when the telephoto position is reached. Bland scenes that do not contain many sharp edges and/or contrast can also prove difficult for auto-focus algorithms to find proper focus positions.

Further, in scenes where a target is already in focus, the auto-focus algorithm may have a lock on that target. When other objects pass through the scene briefly, the auto-focus cycle is triggered and the camera hunts again for optimum focus temporarily taking the target out-of-focus.

Additionally, while panning and tilting to new scenes while keeping the auto-focus algorithms running, the system continually searches for focus since objects are moving quickly in and out of the view. While panning, the focal distance to targets generally remains the same. However, as the auto-focus algorithm is operating on the sharpness of the scene and changes in the objects in the overall scene, it will tend to search. While tilting, the focal distance to targets only incrementally changes, but again the auto-focus control may initiate multiple focus hunt cycles while the unit remains in motion.

Several approaches have been taken to try to mitigate the problems mentioned above. However, these approaches each have their own disadvantages, and none of them are able to account for all of the problems mentioned above at the same time. Additionally, some existing approaches are not able to address one or more of the above problems at all.

For example, Sure Focus is an approach where, once the PTZ unit has stopped moving, the focus position is locked and future movement is prevented once the auto-focus system has achieved what it considers to be a best focus lock. This approach can mitigate the problems of the system going through an auto-focus cycle when objects or even bright point light sources such as car headlights move into or in front of the scene at a later time. However, this focus cannot be locked on a PTZ unit once the user wishes to pan, tilt, or zoom away from the current scene that is locked as the focal position for targets to be in focus will change with that movement. Additionally, this approach does not have any means to address difficulties in obtaining an initial focus lock in low light conditions, bland scenes, or scenes that have bright points already in view. Further, as this approach only operates when the unit is not in motion, it cannot improve any of the auto-focus issues involved in zooming, panning, or tilting.

Alternatively, locking the focus while panning can prevent the auto-focus cycle from occurring, but it relies on the original scene to be in focus at the time of the lock. Likewise, locking the focus while tilting also prevents the auto-focus hunt cycle from occurring, but it relies on the original scene to be in focus as well as any new scenes to be within the depth of field of the original scene. Further, like the Sure Focus approach, this approach cannot mitigate focus problems from bright points, bland scenes, and low light conditions. As mentioned, locking the focus while tilting depends on the original scene being in focus and the new scene having close to the same focal distance to the target objects. If the unit is tilted such that the distance to targets differs by an amount greater than the depth of field, the focus position at the start of the move will be invalid for the new scene. Additionally, once the new position is reached, the auto-focus algorithm is utilized once more and the system may experience another cycle of focus hunting.

In view of the above, improved focus control techniques for PTZ camera systems are provided herein. The systems provide for, e.g., auto-focus of PTZ cameras, installation height based focus control for PTZ cameras, and other functionality. In general, a set of trace curves is identified that corresponds to a range of distances associated with a camera system. Each of the trace curves specifies relationships between focus lens positions and zoom lens positions for a corresponding distance. Using the set of trace curves and at least one of pan angle or tilt angle of the camera system, a trace curve is selected. A focus lens position for a current zooming factor of the camera system is then identified based on the selected trace curve. Trace curves may also be adapted to account for a structure, such as a dome bubble, placed over the camera system. By predetermining a functional relationship for the new trace curve and ratio values associated with target distances after the effect of a dome bubble has been applied, means can be provided to put the camera in focus for any known distance. As used below, these values are referred to as a "bubble adjusted trace curve." Various techniques for implementing focus control for a PTZ camera are described in further detail below; however, other techniques are also possible.

Auto-Focus for PTZ Cameras

According to the characteristics of a trace-curve, if a set of trace-curves covering the range of distance to be used is given, the trace curve for any specific distance can be interpolated. Thus, a trace-curve LUT can be built by using an auto-focus algorithm to find the trace-curves for different pan/tilt positions. Subsequently, given a pan/tilt position, a corresponding trace-curve can be found from the LUT without having to repeat the auto-focus algorithm. In this way, the fixed nature of a PTZ camera is leveraged to predetermine trace curves corresponding to a range of different pan and/or tilt positions such that these trace-curves can be retrieved without subsequent auto-focus operations. This technique is described in further detail below.

After camera installation, a calibration procedure is conducted as follows:

1. Find the set of trace-curves that cover the range of distances to be used. For instance, assuming N distances (or trace-curves) and M zoom lens positions for each distance, example pseudo code to find the trace-curves is as follows:

```
For i = 1 to N:
    Set the distance to Di
    For j = 1 to M (assume M is the tele (telephoto) end zoom lens
        position)
        Set zoom lens position at Zj
        T(i,j) = the best focus lens position found by the auto-focusing
            algorithm
```

2. The camera scans the covered region, and at each position the distance is measured and stored. Assuming the covered region includes X different panning positions and Y different tilting positions, example pseudo code for measuring the distance is as follows:

```
Set the zoom lens position at the tele end
For i = 1 to X
    Set pan angle = θ(i)
    For j = 1 to Y
        Set tilt angle = φ(j)
        P(i,j) = the best focus lens position found by the auto-focusing
            algorithm
```

As used above, P(i,j) is the focus lens position when the zoom lens is fixed at the telephoto end. The zoom lens position fixed at the telephoto end is used since the focus lens positions are most spread at said end. While both pan and tilt angles are utilized in the above example, only one of such angles may be used. For instance, if the trace-curve LUT is assumed to be constant with respect to pan angle, the above step may be performed for tilt angle only. Since the relationship between the focus lens position and actual distance is a one-to-one mapping, finding the focus lens position is the same as finding the actual distance.

The focus lens position for given pan and tilt positions can be interpolated from the stored trace-curves (T) and distances (P). Example pseudo code to find the focus lens position is as follows:

Let x=pan angle and $\theta(i) \leq x \leq \theta(i+1)$
Let y=tilt angle and $\phi(j) \leq y \leq \phi(j+1)$
Interpolate the tele end focus lens position from four focus lens positions:

$$(P(i,j), P(i+1,j), P(i,j+1), P(i+1,j+1)).$$

Let f=the interpolated focus lens position at the tele end and $T(k,M) \leq f \leq T(k+1,M)$
Interpolate the actual focus lens position for the current zooming factor from trace-curves (k and k+1)

Various interpolation algorithms known in the art can be used, such as linear, cubic, or higher order interpolation.

By using the above techniques, a camera system can find the correct focus lens position to produce a focused image without regard to favorability of lighting conditions.

Install Height Based Focus Control for PTZ Camera Systems

Figure 2:
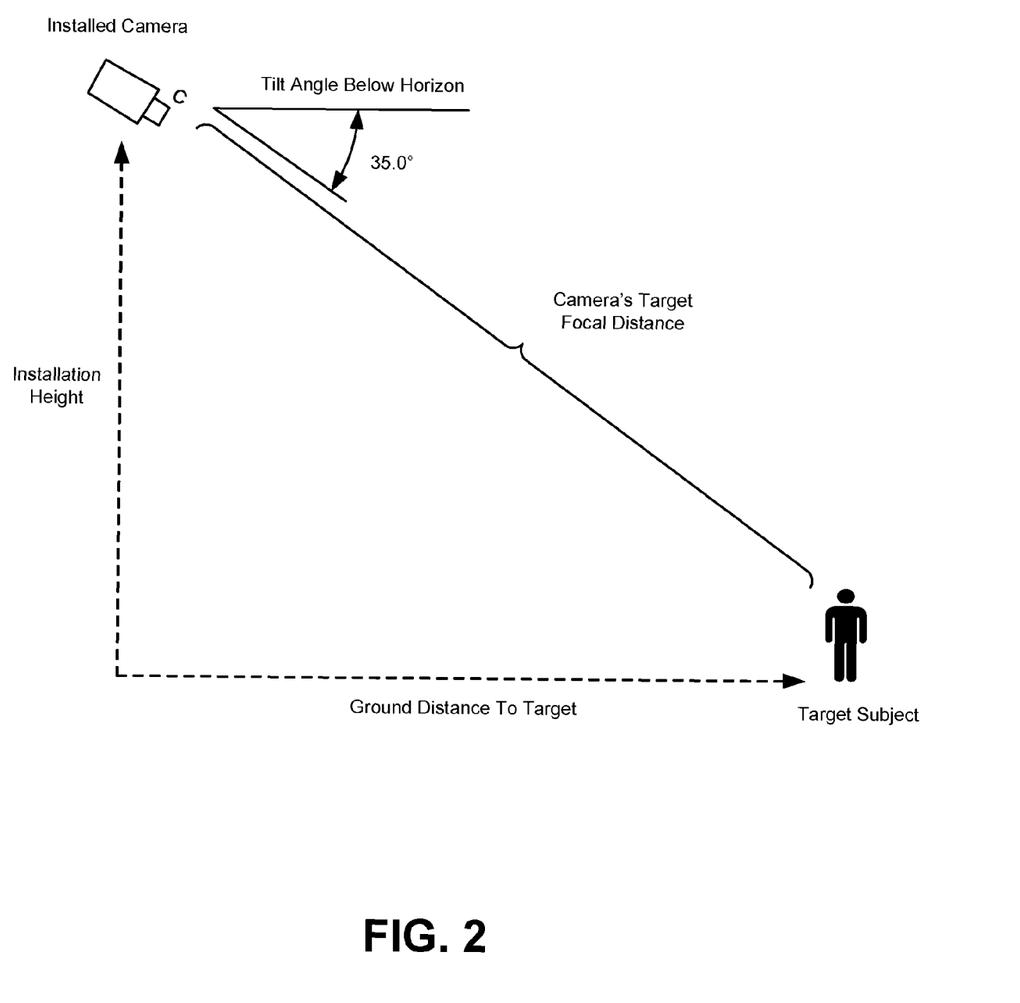
FIG. 2 is an illustrative view of measurement data utilized by a camera system for height controlled focus control.

In some instances, a camera system can be configured to operate with install height based focus control as described below. Install height based focus control leverages relationships between installation height and tilt angle to calculate a ground distance to a target using trigonometric principles, based on which the camera focus can be adjusted. An example of the information utilized in this technique is illustrated by FIG. 2.

If the distance to ground level line of sight targets is calculated at runtime as described herein, using installation height and the current tilt angle, the focus position to a bubble adjusted trace curve and optimum focus can be achieved for those targets without the use of auto-focus. Additionally, upon zooming the focus is moved according to the determined bubble adjusted trace curve for the current calculated distance, and the line-of-sight targets on the ground remain in focus throughout the zoom operation as the bubble adjusted trace curve is followed.

Because auto-focus is not used, the auto-focus cycle hunting experienced in low light scenes, bright point scenes, bland scenes, while panning and tilting the dome, etc., is not encountered. Additionally, while zooming, the bubble adjusted trace curve is followed, enabling the camera to remain in focus while zooming from wide to telephoto.

Height adjusted focus control can make use of one or more of the following properties. For instance, the algorithm for doing height adjusted focus may be configured, and possibly optimized, for the following conditions:

1. The unit is installed at a 90 degree angle from the ground such that the angle when the unit is centered on the horizon is 0 and angles below the horizon will be considered negative degrees (i.e., −1.00 to −90.00 degrees).

2. Installation height is known in advance through user input or automatically calculated from calibration to an accuracy and precision of +/−0.1 meter.

3. A functional relationship can be determined to calculate a bubble adjusted trace curve.

4. The current runtime tilt angle is known on the platform. The tilt angle may preferably be known to +/−0.1 degrees or better.

During runtime, the distance to the ground level target is calculated using the following formulas:

$$\theta = -\omega \times (\pi/180)$$

$$d = h/\sin(\theta)$$

where $\theta$ is the tilt angle in radians, $\omega$ is the tilt angle in degrees, d is the distance to the target, and h is the installation height.

Based on the above calculations, the target focal distance d is translated to a bubble-adjusted trace curve using a mapping of the known distance d to a relative trace position between two existing trace curve data sets in the varifocal camera package. As the unit is tilted, the target focal distance changes as the ground in view moves further or closer into view. The focus lens of the unit is then moved to match the new target focal distance, according to the trace curve corresponding to said distance.

Various implementations of height adjusted focus control as described herein assume that the subjects being targeted are on the ground. If the subjects being targeted are higher off the ground then the typical depth-of-field during normal operation, the installation height can be adjusted and decreased by that distance off the ground to keep the subject in focus even in the extreme case when the camera is pointing 90 degrees down from the horizon.

To perform the above calculations, the end user for the camera system can first input the installation height of the unit through a graphical user interface (GUI) object, such as a web interface slider, text box, etc., an API call, or the like. Alternatively, a default install height may be calculated through a calibration sequence in which information from the camera after an auto-focus lock or several auto-focus locks at different angles are used to automatically determine the height. Next, the user may enable the focus trace functionality by setting it on in the GUI, by using an associated API call, etc. The focus trace mode can be configured with various behaviors based on other settings in the system as described below.

Focus Trace On:

When this setting is set to 'On,' the camera selects the bubble adjusted trace curve when zooming based on the distance to ground-level targets in the scene at the current tilt angle.

If the master runtime 'Auto Focus' setting is set to 'Off' in this case, then the camera also adjusts focus position in real-time based on the distance to ground-level targets in the scene while the unit actively pans and tilts. This behavior may additionally or alternatively be added to the operation of the unit when panning and tilting when the master runtime auto-focus mode setting is set to 'On.'

Focus Trace Off:

With Focus Trace set to 'Off,' the camera chooses from many possible trace curves when zooming without reference to the installation height and current tilt angle.

In addition to the above, install height may also be automatically determined by adding a calibration step to the above procedure in which the system tilts straight down and achieves auto-focus lock and then reads the trace curve, trace ratio, and focal position data for that lock to determine the distance.

Example PTZ Camera

Figure 3:
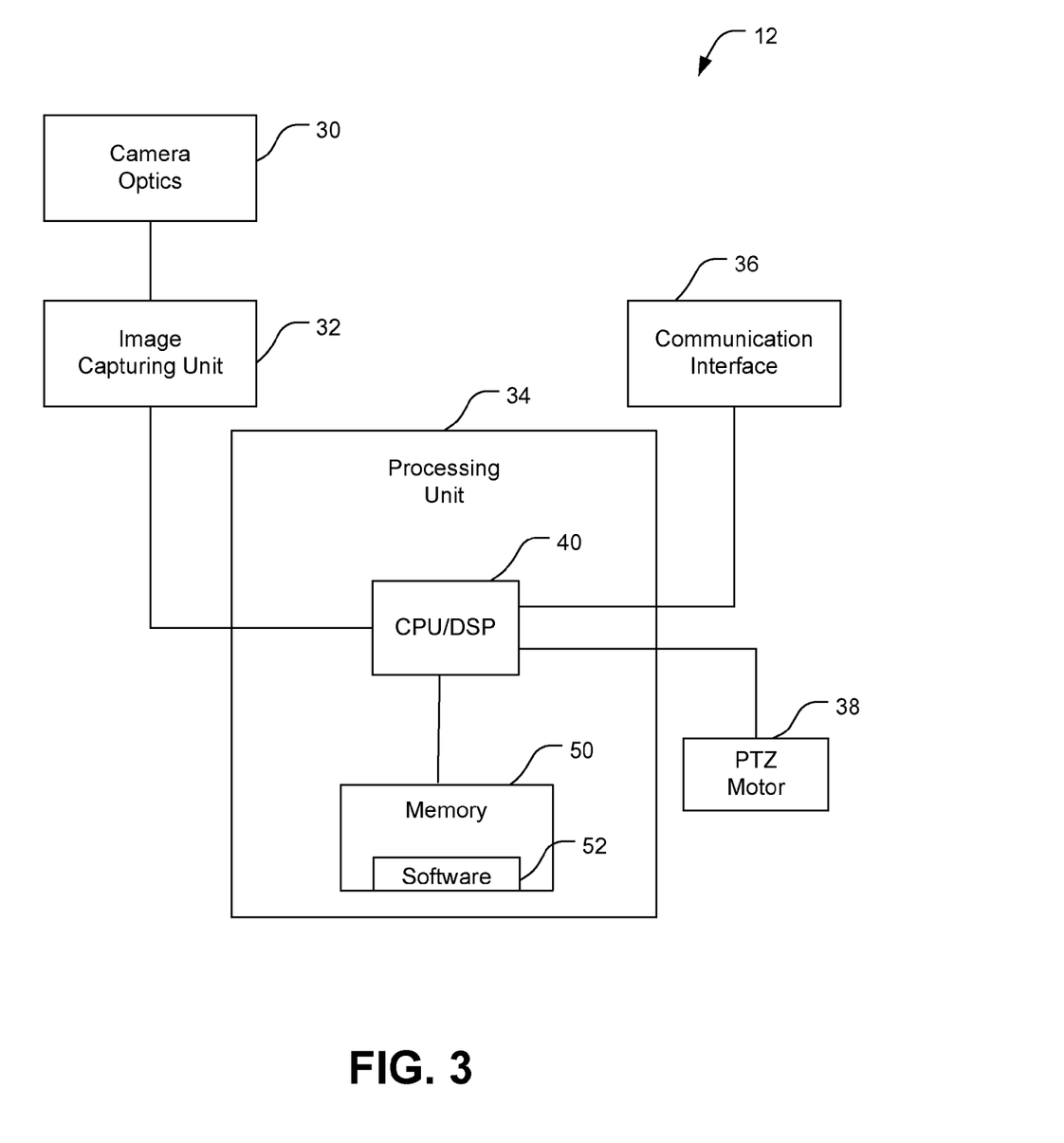
FIG. 3 is a diagram illustrating an example camera system.

Referring to FIG. 3, an example camera 12 that can be utilized in conjunction with the techniques described herein includes camera optics 30, an image capturing unit 32, a processing unit 34, a communication interface 36, and a PTZ motor 38. The image capturing unit comprises lenses and other optical components, and is communicatively coupled with the image capturing unit 32. The image capturing unit 32 includes a charge-coupled device (CCD) and/or other technology to convert optical images into electrical information that is transferred to the processing unit 34. Also coupled with the processing unit 34 is the communication interface 36 through which information is sent to and received from the server 14, e.g., through a communication network such as a local area network, a wide area network, a wireless network, etc. The PTZ motor 38 is configured to actuate the camera 12 to pan, tilt, and zoom, and may include more than one motor.

The processing unit 34 processes image information and includes a central processing unit (CPU) or digital-signal processor (DSP) 40 and memory 42. The CPU/DSP 40 is preferably an intelligent device, e.g., a personal computer central processing unit (CPU) such as those made by Intel® Corporation or AMD®, a microcontroller, an application specific integrated circuit (ASIC), etc. DSPs, such as the DM6446 made by Texas Instruments®, can also be used. The CPU/DSP 40 is coupled to the memory 42 that includes random access memory (RAM) and read-only memory (ROM). The memory 42 is non-transitory and preferably stores machine-readable, machine-executable software code 44 containing instructions that are configured to, when executed, cause the CPU/DSP 40 to perform various functions described herein. Alternatively, the software 44 may not be directly executable by the processor CPU/DSP 40 but is configured to cause the processor CPU/DSP 40, e.g., when compiled and executed, to perform functions described herein. In this example, the display 18 is one video display panel, but more than one video display panel could be used.

Figure 4:
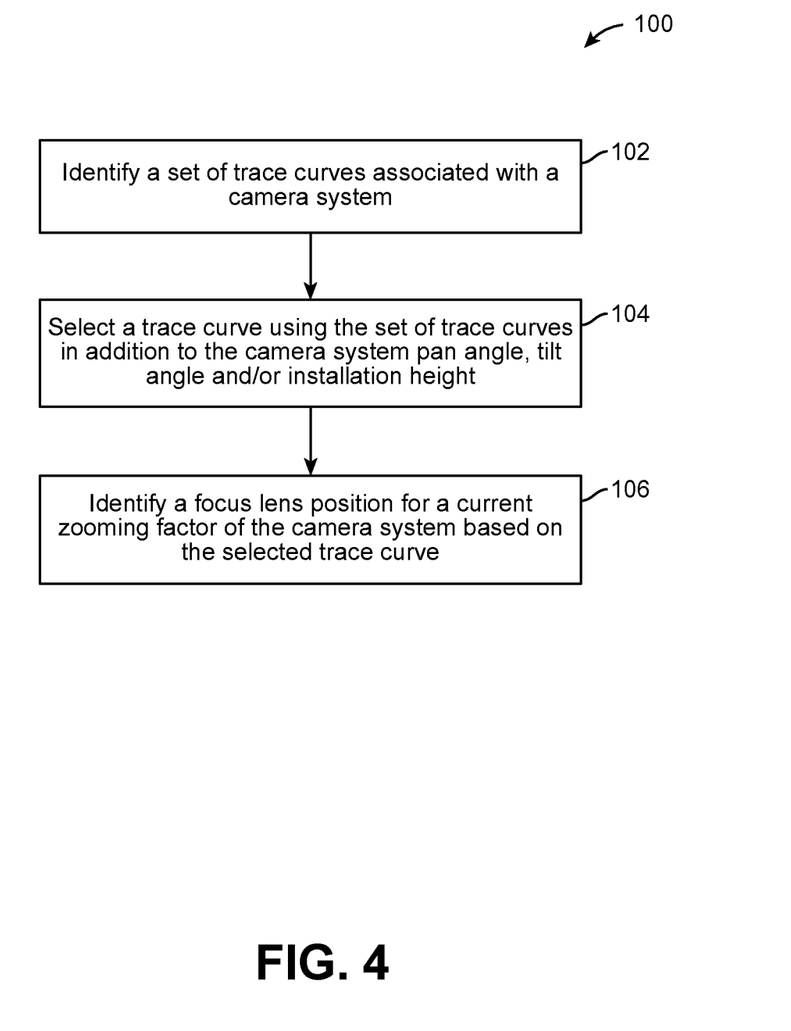
FIG. 4 is a block flow diagram of a process of adjusting focus for a camera system.

Referring next to FIG. 4, with further reference to FIGS. 1-3, a process 100 of adjusting focus for a camera system, such as a camera 12, includes the stages shown. The process 100 is, however, an example only and not limiting. The process 100 can be altered, e.g., by having stages added, removed, rearranged, combined, and/or performed concurrently. Still other alterations to the process 100 as shown and described are possible. One or more of the operations described in process 100 can be performed in hardware and/or in software.

The process 100 begins at stage 102, wherein a set of trace curves associated with the camera system is identified. As described above, each of the trace curves in the set of trace curves specify relationships between focus lens positions and zoom lens positions for a corresponding camera position. At stage 104, a trace curve is selected using the set of trace curves and one or more or properties of the camera system, which include but are not limited to pan angle, tilt angle, and installation height of the camera system. At stage 106, a focus lens position is identified for a current zooming factor of the camera system based on the selected trace curve.

Figure 5:
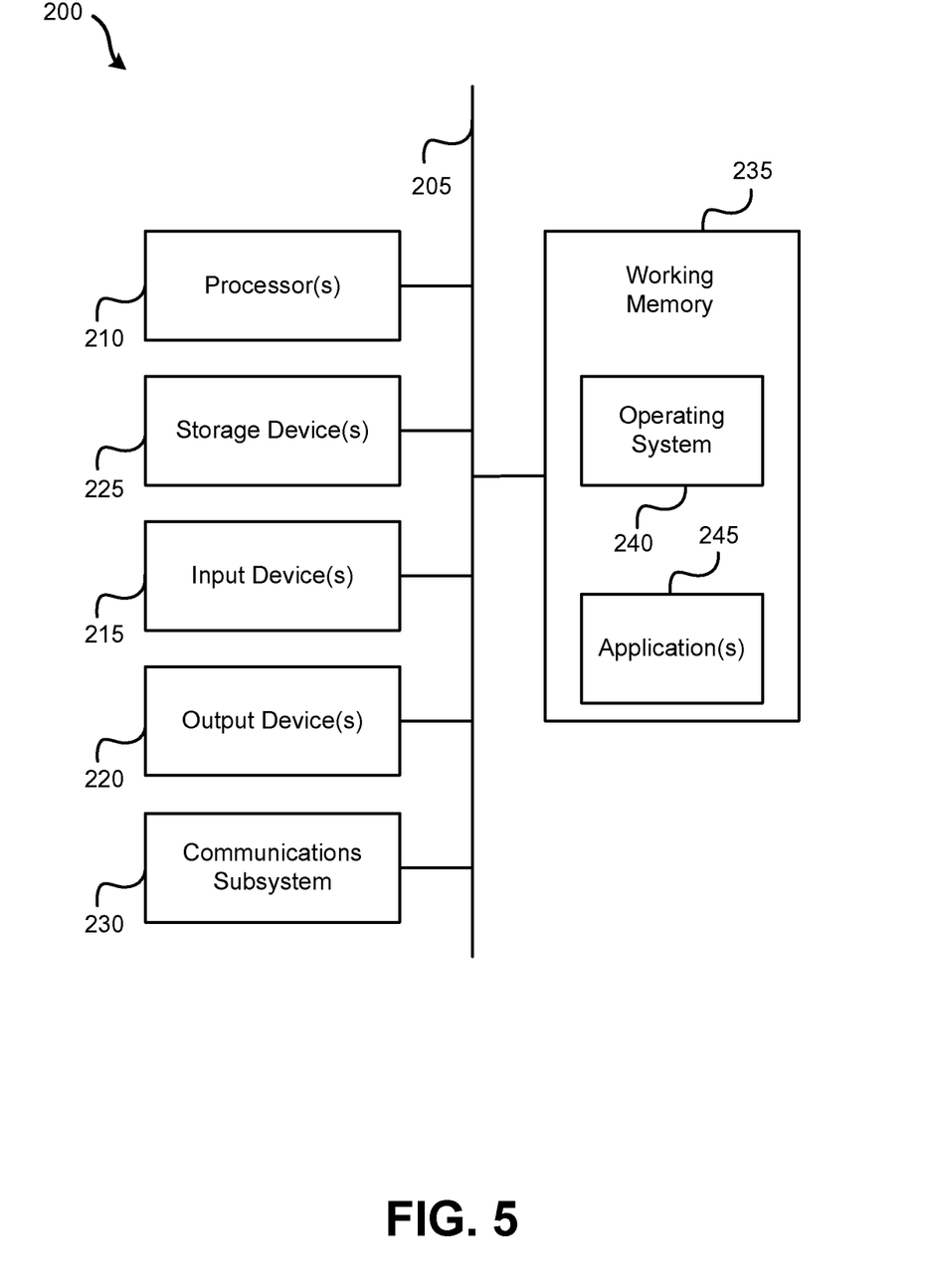
FIG. 5 is a block diagram of an embodiment of a computer system.

The actions associated with process 100, and/or any other operations described above, may be performed via hardware, software, or a combination of hardware and software. For an implementation at least partially based in software, a computer system as illustrated in FIG. 5 may be used to perform one or more operations as described above. FIG. 5 provides a schematic illustration of a computer system 200 that can perform the methods provided by various other configurations, as described herein, and/or can function as the host computer system, a remote kiosk/terminal, a point-of-sale device, a mobile device, and/or a computer system. FIG. 5 provides a generalized illustration of various components, any or all of which may be utilized as appropriate. FIG. 5, therefore, broadly illustrates how individual system elements may be implemented in a relatively separated or relatively more integrated manner.

The computer system 200 is shown comprising hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 215, which can include without limitation a mouse, a keyboard and/or the like; and one or more output devices 220, which can include without limitation a display device, a printer and/or the like.

The computer system 200 may further include (and/or be in communication with) one or more non-transitory storage devices 225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 230 may permit data to be exchanged with a network (such as the network described below, to name one example), other computer systems, and/or any other devices described herein. In many configurations, the computer system 200 will further comprise a working memory 235, which can include a RAM or ROM device, as described above.

The computer system 200 also can comprise software elements, shown as being currently located within the working memory 235, including an operating system 240, device drivers, executable libraries, and/or other code, such as one or more application programs 245, which may comprise computer programs provided by various configurations, and/or may be designed to implement methods, and/or configure systems, provided by other configurations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 225 described above. In some cases, the storage medium might be incorporated within a computer system, such as the system 200. In other configurations, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.), then takes the form of executable code.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some configurations may employ a computer system (such as the computer system 200) to perform methods in accordance with various configurations of the invention. According to a set of configurations, some or all of the procedures of such methods are performed by the computer system 200 in response to processor 210 executing one or more sequences of one or more instructions (which might be incorporated into the operating system 240 and/or other code, such as an application program 245) contained in the working memory 235. Such instructions may be read into the working memory 235 from another computer-readable medium, such as one or more of the storage device(s) 225. Merely by way of example, execution of the sequences of instructions contained in the working memory 235 might cause the processor(s) 210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 200, various computer-readable media might be involved in providing instructions/code to processor(s) 210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 225. Volatile media include, without limitation, dynamic memory, such as the working memory 235. Transmission media include, without limitation, coaxial cables, copper wire and fiber optics, including the wires that comprise the bus 205, as well as the various components of the communication subsystem 230 (and/or the media by which the communications subsystem 230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various configurations of the invention.

The communications subsystem 230 (and/or components thereof) generally will receive the signals, and the bus 205 then might carry the signals (and/or the data, instructions, etc. carried by the signals) to the working memory 235, from which the processor(s) 205 retrieves and executes the instructions. The instructions received by the working memory 235 may optionally be stored on a storage device 225 either before or after execution by the processor(s) 210.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

The invention claimed is:

1. A method of adjusting focus for a camera system, the method comprising:
building a lookup table (LUT) for a set of trace curves associated with the camera system, each of the set of trace curves specifying relationships between focus lens positions and zoom lens positions for a corresponding camera position wherein each entry in the LUT corresponds to a respective combination of a pan angle and a tilt angle of the camera system;
interpolating a trace curve from at least one entry of the LUT based on at least one of the pan angle or the tilt angle of the camera system; and
identifying a focus lens position for a current zooming factor of the camera system based on the interpolated trace curve.

2. The method of claim 1 wherein building the LUT comprises:
identifying a set of target focal distances corresponding to trace curves in the LUT; and
for each of the set of target focal distances, finding a corresponding trace curve by identifying optimal focus lens positions corresponding to a plurality of zoom lens positions using an auto-focus algorithm.

3. The method of claim 2 comprising computing a target focal distance of the set of target focal distances based on an installation height of the camera system and the tilt angle of the camera system.

4. The method of claim 3 wherein the installation height is provided as user input.

5. The method of claim 3 wherein the installation height is computed using a calibration procedure.

6. The method of claim 1 wherein the interpolating comprises:
interpolating a focus lens position corresponding to a telephoto zoom lens position at the pan angle of the camera system and the tilt angle of the camera system;
obtaining one or more best-fit trace curves for the interpolated focus lens position from the LUT; and
interpolating the trace curve using the one or more best-fit trace curves.

7. The method of claim 1 wherein building the LUT comprises building the LUT to account for a structure placed over the camera system.

8. An apparatus comprising:
means for building a lookup table (LUT) for a set of trace curves associated with a camera system, each of the set of trace curves specifying relationships between focus lens positions and zoom lens positions for a corresponding camera position wherein each entry in the LUT corresponds to a respective combination of a pan angle and a tilt angle of the camera system;

means for interpolating a trace curve from at least one entry of the LUT based on at least one of the pan angle or the tilt angle of the camera system; and means for identifying a focus lens position for a current zooming factor of the camera system based on the interpolated trace curve.

9. A system for adjusting focus for a camera system, the method comprising:

at least one processor configured to perform acts comprising:

building a lookup table (LUT) for a set of trace curves associated with the camera system, each of the set of trace curves specifying relationships between focus lens positions and zoom lens positions for a corresponding camera position wherein each entry in the LUT corresponds to a respective combination of a pan angle and a tilt angle of the camera system;

interpolating a trace curve from at least one entry of the LUT based on at least one of the pan angle or the tilt angle of the camera system; and identifying a focus lens position for a current zooming factor of the camera system based on the interpolated trace curve; and at least one memory communicatively coupled to the at least one processor and configured to store data.

10. A computer program product residing on a non-transitory processor readable storage medium and comprising processor executable instructions configured to cause a processor to:

build a lookup table (LUT) for a set of trace curves associated with a camera system, each of the set of trace curves specifying relationships between focus lens positions and zoom lens positions for a corresponding camera position wherein each entry in the LUT corresponds to a respective combination of a pan angle and a tilt angle of the camera system;

interpolate a trace curve from at least one entry of the LUT based on at least one of the pan angle or the tilt angle of the camera system; and identify a focus lens position for a current zooming factor of the camera system based on the interpolated trace curve.

* * * * *